United States Patent
Taira

(10) Patent No.: US 10,263,653 B1
(45) Date of Patent: Apr. 16, 2019

(54) NOISE REDUCTION DEVICE AND NOISE REDUCTION METHOD

(71) Applicant: DENSO TEN Limited, Kobe-shi, Hyogo (JP)

(72) Inventor: Masaaki Taira, Kobe (JP)

(73) Assignee: DENSO TEN Limited, Kobe (JP)

( * ) Notice: Subject to any disclaimer, the term of this patent is extended or adjusted under 35 U.S.C. 154(b) by 0 days.

(21) Appl. No.: 16/085,716

(22) PCT Filed: Mar. 8, 2017

(86) PCT No.: PCT/JP2017/009339
§ 371 (c)(1),
(2) Date: Sep. 17, 2018

(87) PCT Pub. No.: WO2017/208556
PCT Pub. Date: Dec. 7, 2017

(30) Foreign Application Priority Data

May 30, 2016 (JP) ................................. 2016-107458

(51) Int. Cl.
*H04B 1/10* (2006.01)

(52) U.S. Cl.
CPC ................................ *H04B 1/1027* (2013.01)

(58) Field of Classification Search
CPC ......... H04B 1/10; H04B 1/1027; H04B 1/109
See application file for complete search history.

(56) References Cited

U.S. PATENT DOCUMENTS

| | | | | |
|---|---|---|---|---|
| 9,083,572 | B2 * | 7/2015 | Kim | ............... H04L 25/0224 |
| 2010/0112970 | A1 * | 5/2010 | Nakata | ............... H04B 1/1036 |
| | | | | 455/296 |
| 2014/0177868 | A1 * | 6/2014 | Jensen | ............... H04R 3/002 |
| | | | | 381/94.7 |

FOREIGN PATENT DOCUMENTS

| | | |
|---|---|---|
| EP | 1160969 A1 | 12/2001 |
| JP | H11-068593 A | 3/1999 |
| JP | H11-344999 A | 12/1999 |
| JP | 2003-022100 A | 1/2003 |
| JP | 2013-009066 A | 1/2013 |
| JP | 2013-223185 A | 10/2013 |
| JP | 2017-129741 A | 7/2017 |

OTHER PUBLICATIONS

May 30, 2017 International Search Report issued in International Patent Application No. PCT/JP2017/009339.

* cited by examiner

*Primary Examiner* — Nguyen T Vo
(74) *Attorney, Agent, or Firm* — Oliff PLC

(57) ABSTRACT

A noise reduction device according to an aspect of an embodiment includes a detection unit, a calculation unit, and a reduction unit. The detection unit detects frequency components of a plurality of noise signals that are included in a received signal, based on a frequency spectrum of the received signal. The calculation unit calculates a coefficient, based on the frequency components that are detected by the detection unit. The reduction unit reduces n noise signals that are at least a part of the plurality of noise signals from the received signal, depending on the coefficient that is calculated by the calculation unit (where n is a positive number that is greater than or equal to 2).

4 Claims, 8 Drawing Sheets

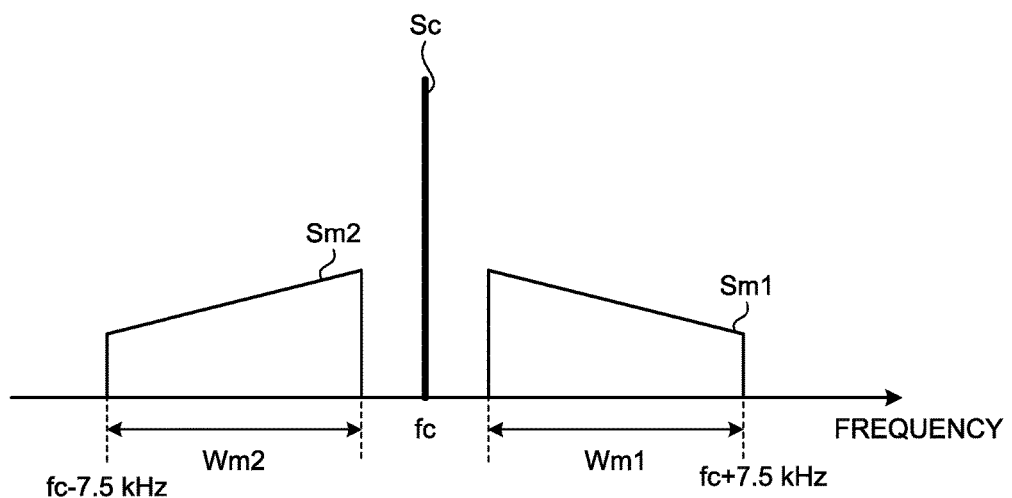

NOISE REDUCTION DEVICE AND NOISE REDUCTION METHOD

CROSS-REFERENCE TO RELATED APPLICATION

This application is a national stage application of International Application No. PCT/JP2017/009339 filed on Mar. 8, 2017, which designates the United States, which is herein incorporated by reference, and which is based upon and claims the benefit of priority to Japanese Patent Application No. 2016-107458, filed on May 30, 2016, the entire contents of which are herein incorporated by reference.

FIELD

The present disclosure relates to a noise reduction device and a noise reduction method.

BACKGROUND

Conventionally, in a case where a system that receives a radio broadcast wave is mounted on a vehicle, such a system may receive, for example, a noise signal that is caused by a switching process that is executed at a time of power conversion of a battery of the vehicle. Accordingly, a conventional system reduces an output intensity for a peak frequency with a highest intensity among frequency components that are included in a received signal, so that a noise signal is reduced.

However, a conventional technique merely reduces a noise signal at a peak frequency with a highest intensity. Therefore, for example, in a case where a plurality of noise signals are included in a received signal, there is a possibility that such noise signals are not completely reduced and a noise signal remains in the received signal.

SUMMARY

A noise reduction device according to an embodiment includes a detection unit, a calculation unit, and a reduction unit. The detection unit detects frequency components of a plurality of noise signals that are included in a received signal, based on a frequency spectrum of the received signal. The calculation unit calculates a coefficient, based on the frequency components that are detected by the detection unit. The reduction unit reduces n noise signals that are at least a part of the plurality of noise signals from the received signal, depending on the coefficient that is calculated by the calculation unit (where n is a positive number that is greater than or equal to 2).

BRIEF DESCRIPTION OF DRAWINGS

FIG. 1C is a diagram illustrating a received signal where a nose signal is eliminated by a receiving device according to a first embodiment.

DESCRIPTION OF EMBODIMENTS

Hereinafter, embodiments of a noise reduction device and a noise reduction method that are disclosed in the present application will be explained in detail with reference to the accompanying drawings. Additionally, this invention is not limited by embodiments illustrated below.

First Embodiment

Figure 1A:
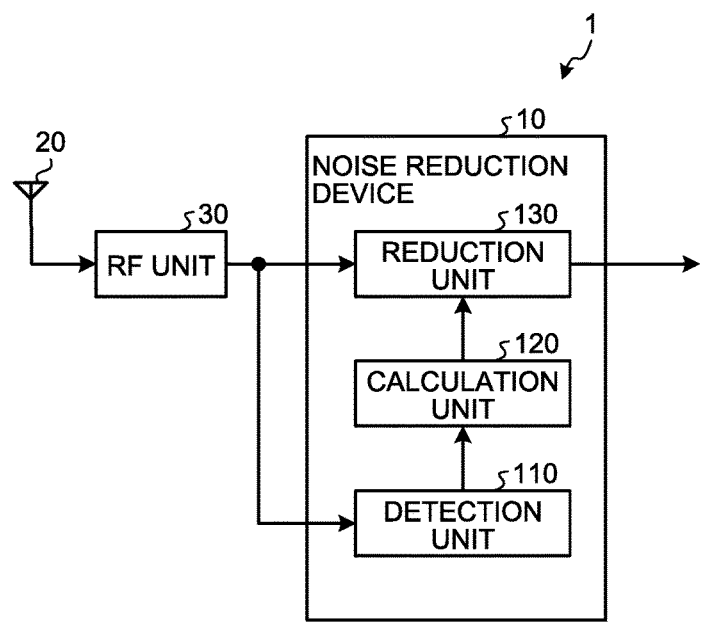
FIG. 1A is a block diagram illustrating a configuration of a receiving device according to a first embodiment.
Figure 1B:
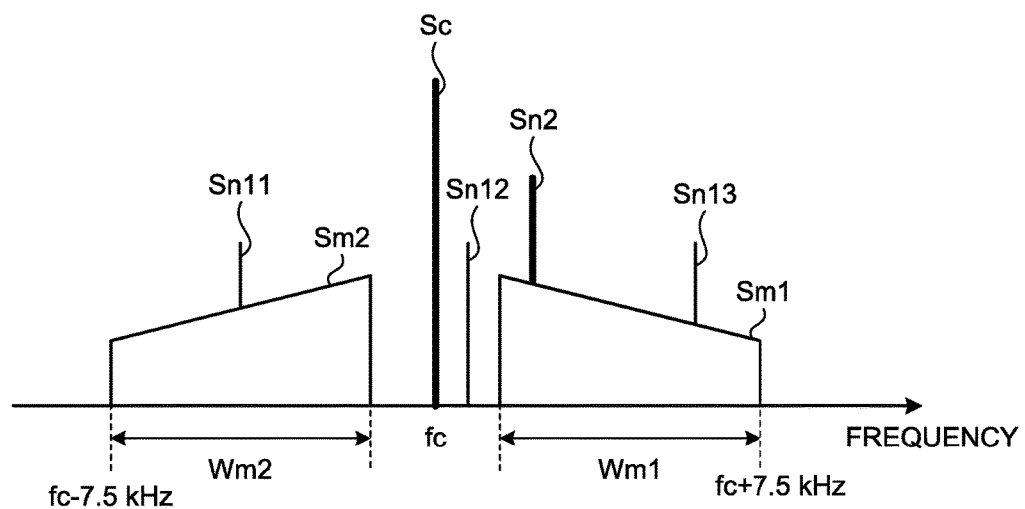
FIG. 1B is a diagram illustrating a received signal that is received by a receiving device according to a first embodiment.

A receiving device 1 according to a first embodiment of the present invention will be explained by using FIG. 1A to FIG. 1C. FIG. 1A is a block diagram illustrating a configuration of the receiving device 1 according to the present embodiment. Furthermore, FIG. 1B is a diagram illustrating a received signal that is received by the receiving device 1 according to the present embodiment. FIG. 1C is a diagram illustrating a received signal where a noise signal is eliminated by the receiving device 1 according to the present embodiment.

Such a receiving device 1 is mounted on, for example, a vehicle such as a car. Furthermore, the receiving device 1 receives, for example, an amplitude-modulated radio broadcast wave that is transmitted by using a medium wave band of 526.5 kHz to 1606.5 kHz (that will also be described as an AM radio broadcast wave, below). An AM radio broadcast wave includes information on a sound or voice (that will also be described as sound or voice data, below).

Additionally, a case where such a receiving device 1 is mounted on a vehicle will be explained in the present embodiment and this is not limiting. The receiving device 1 may be mounted on, for example, a movable body such as a train or an airplane, an appliance such as a radio receiver or a personal computer, or the like. Furthermore, the receiving device 1 does not have to receive a radio broadcast wave as long as an amplitude-modulated receiving signal is received.

Receiving Device 1

As illustrated in FIG. 1A, the receiving device 1 has a noise reduction device 10, an antenna 20, and a Radio Frequency (RF) unit 30. The antenna 20 receives, for example, an AM radio broadcast wave as a received signal.

The RF unit 30 applies a signal process such as an amplification process, an A/D conversion process, or down-converting to a received signal that is received through the antenna 20.

The noise reduction device 10 reduces a plurality of noise signals from a received signal. The noise reduction device 10 has a detection unit 110, a calculation unit 120, and a reduction unit 130.

The detection unit 110 detects frequency components of a plurality of noise signals that are included in a received signal, based on a frequency spectrum of the received signal. As illustrated in FIG. 1B, a received signal includes a carrier wave Sc with a carrier frequency fc and modulated waves Sm1 and Sm2 in an upper sideband Wm1 and a lower sideband Wm2. Furthermore, a received signal includes, for example, a plurality of noise signals such as periodic noise signals Sn11 to Sn13 that generate from an inverter, a noise signal Sn2 that generates from a DCDC converter, or the like. Hereinafter, noise signals Sn11 to Sn13 and Sn2 will collectively be described as a noise signal(s) Sn. A noise signal Sn is a so-called peaky noise that has a peak at a particular frequency.

The detection unit 110, for example, compares a frequency spectrum of a received signal with a threshold and thereby detects frequency components and signal levels of a plurality of noise signals Sn. Additionally, FIG. 1B illustrates a case where four noise signals Sn are provided.

The calculation unit 120 calculates a coefficient based on frequency components and signal levels that are detected by the detection unit 110. Such a coefficient is, for example, a filter coefficient for a filtering process that is executed by the reduction unit 130. The calculation unit 120 calculates a coefficient in such a manner that a signal level of a received signal at a frequency component that is detected by the detection unit 110 is reduced depending on a signal level that is detected by the detection unit 110. Additionally, a coefficient may be calculated every time the detection unit 110 calculates a noise signal Sn, where it is more preferable to execute it at timing when there is a possibility that a frequency that provides noise is changed. For such timing, there is provided, for example, a time of vehicle start-up, a time when an operation condition or the like of a converter (voltage conversion) is changed, timing for each predetermined period of time or the like where a possibility of time variation (a factor such as a temperature change) is taken into consideration, or the like.

The reduction unit 130 reduces n noise signals Sn that are at least a part of a plurality of noise signals Sn from a received signal, depending on a coefficient that is calculated by the calculation unit 120 (where n is a positive number that is greater than or equal to 2). The reduction unit 130, for example, has a filter and reduces a noise signal Sn from a received signal while a coefficient that is calculated by the calculation unit 120 is provided as a filter coefficient. As illustrated in FIG. 1C, a received signal where a plurality of noise signals Sn are reduced therefrom is provided as a signal that includes a carrier signal Sc and modulated signals Sm1 and Sm2 where a plurality of noise signals Sn11 to Sn13 and Sn2 are reduced. Additionally, although the reduction unit 130 eliminates n=4, that is, all detected noise signals Sn in FIG. 1C, this is not limiting. The reduction unit 130 may reduce at least a part of detected noise signals Sn, and reduces, for example, two noise signals or the like.

Thus, the noise reduction device 10 of the receiving device 1 according to an embodiment detects frequency components of a plurality of noise signals Sn.

Furthermore, the noise reduction device 10 reduces a plurality of noise signals Sn from a received signal, depending on a coefficient that is based on a detected frequency component. Thereby, it is possible for the noise reduction device 10 to reduce a plurality of noise signals Sn from a received signal.

Second Embodiment

Figure 2:
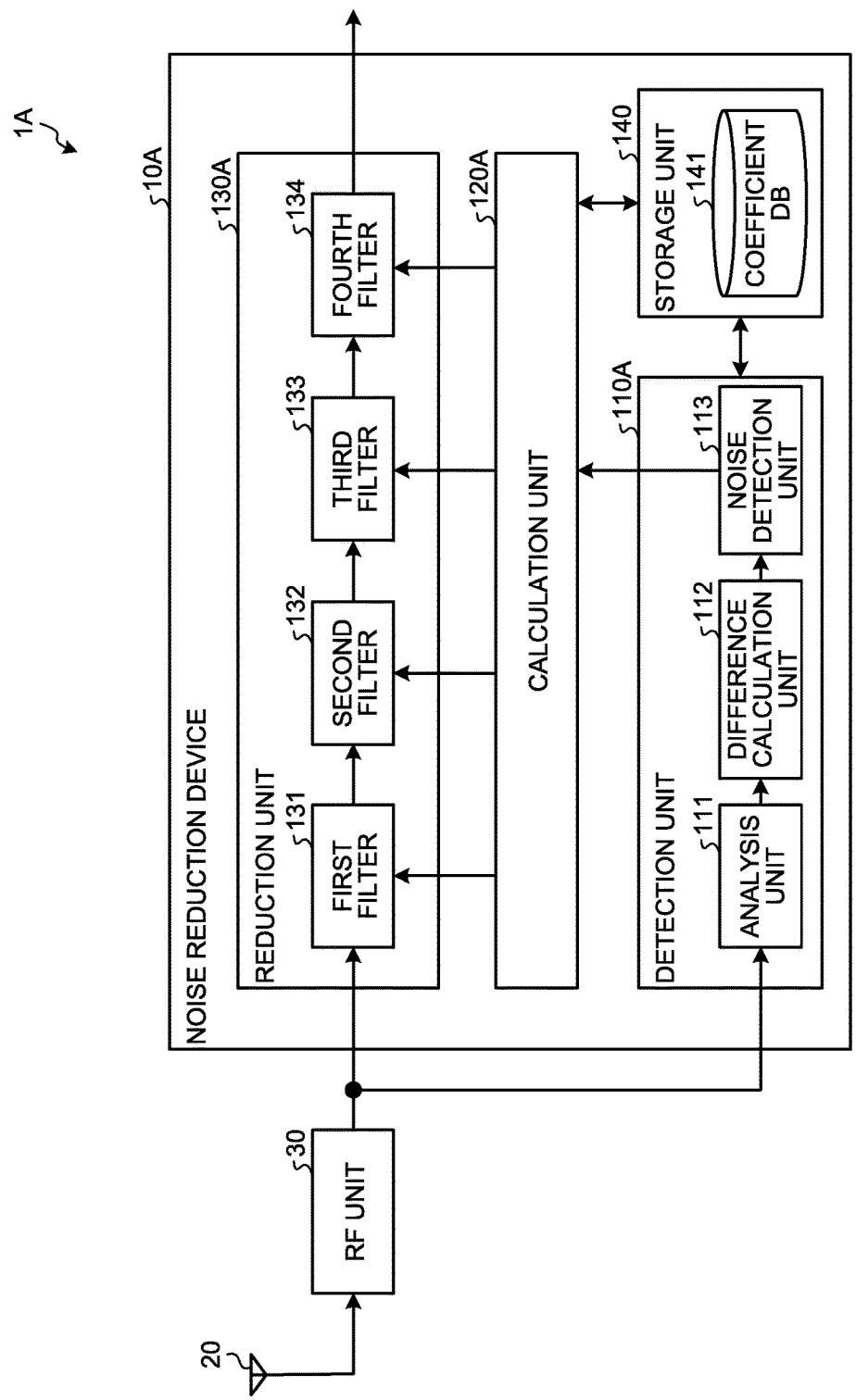
FIG. 2 is a block diagram illustrating a configuration of a receiving device according to a second embodiment.

A receiving device 1A according to a second embodiment will be explained by using FIG. 2 to FIG. 4. FIG. 2 is a block diagram illustrating a configuration of the receiving device 1A according to the second embodiment. Additionally, a component that is identical to that of the receiving device 1 as illustrated in FIG. 1 will be provided with an identical sign and an explanation thereof will be omitted.

Receiving Device 1A

The receiving device 1A as illustrated in FIG. 2 includes a noise reduction device 10A. The noise reduction device 10A has a detection unit 110A, a calculation unit 120A, a reduction unit 130A, and a storage unit 140.

The detection unit 110A has an analysis unit 111, a difference calculation unit 112, and a noise detection unit 113. Furthermore, the reduction unit 130A has n or first to n-th filters 131 to 13n. Additionally, FIG. 2 illustrates a case of n=4.

The analysis unit 111 analyzes a frequency spectrum of a received signal. The analysis unit 111 executes a Fast Fourier transform (FFT) process for a received signal so that a spectral intensity at each frequency component is calculated.

The difference calculation unit 112 calculates a difference between an upper sideband Wm1 and a lower sideband Wm2 in a frequency spectrum of a received signal. Herein, the receiving device 1A receives an AM radio broadcast wave as a received signal. As illustrated in FIG. 1B, in an AM radio broadcast, a signal that is centered at a carrier frequency fc and provided with predetermined bandwidths Wm1 and Wm2 is transmitted. Herein, a predetermined bandwidth is 15 kHz (fc±7.5 kHz).

Furthermore, a signal that is transmitted in an AM radio broadcast is provided with respectively identical frequency distributions in a bandwidth Wm1 on a higher frequency side (an upper sideband) and a bandwidth Wm2 on a lower frequency side (a lower sideband) with respect to a carrier frequency fc.

In the present embodiment, attention is paid to such a point, a difference between spectral intensities in upper and lower sidebands Wm1 and Wm2 of a received signal is calculated so that a modulated component of the received signal is reduced to improve detection accuracy of a noise component.

Specifically, the difference calculation unit 112 calculates a difference between spectral intensities in upper and lower sidebands Wm1 and Wm2 that are positioned at an equal distance from a carrier frequency fc among spectral intensities in the upper and lower sidebands Wm1 and Wm2 of a received signal. The difference calculation unit 112 calculates, as a difference, for example, a result provided by subtracting a lower sideband Wm2 from an upper sideband Wm1 that is positioned at an equal distance from a carrier frequency fc.

As described above, a signal that is transmitted in an AM radio broadcast has a line-symmetric frequency distribution that is centered at a carrier frequency fc and provided with upper and lower sidebands Wm1 and Wm2. Accordingly, as, for example, a difference between upper and lower sidebands Wm1 and Wm2 of a received signal is calculated, a frequency distribution of a difference is a distribution where spectral intensities of modulated signals Sm1 and Sm2 that are transmitted in an AM radio broadcast are approximately zero and a plurality of noise signals Sn remain therein as illustrated in FIG. 3.

Figure 3:
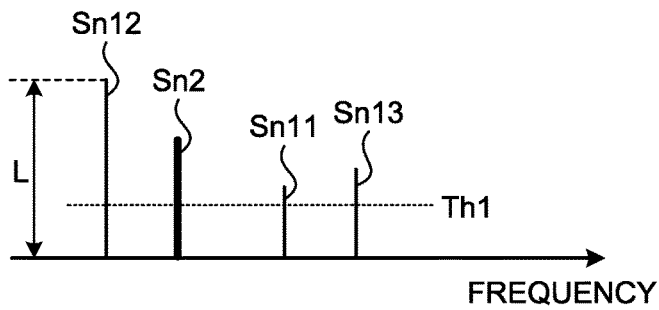
FIG. 3 is a diagram illustrating a frequency distribution of a noise signal according to a second embodiment.
Figure 4:
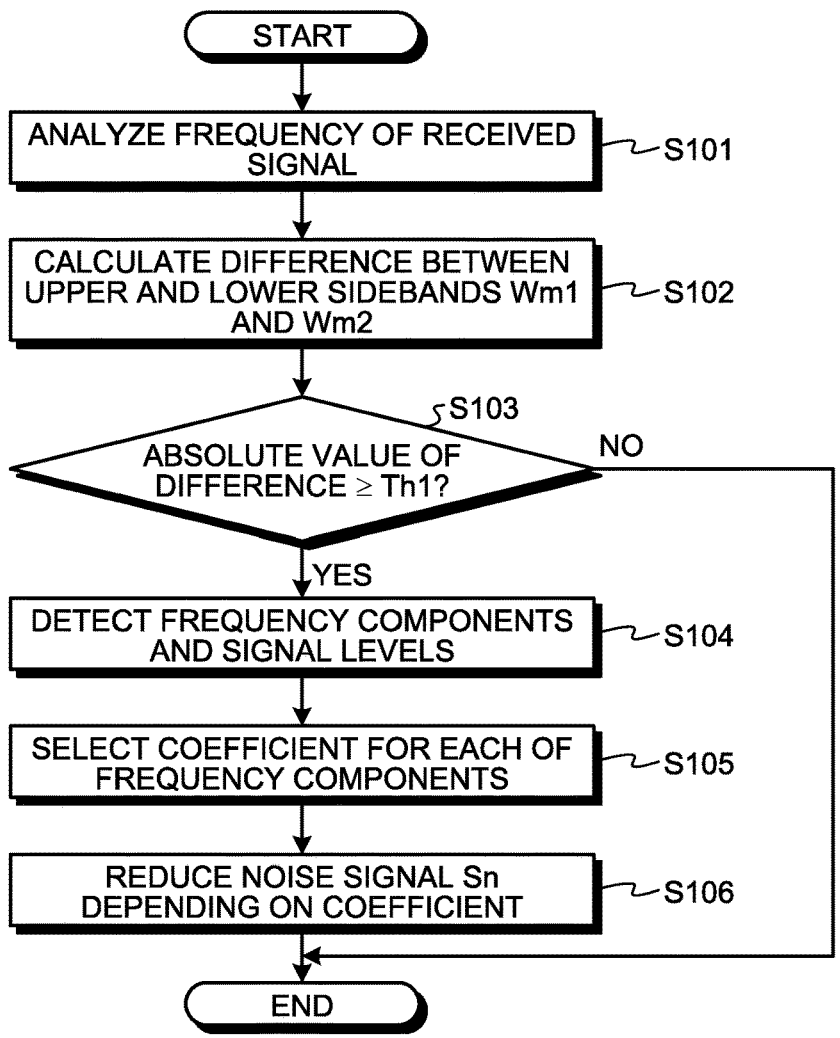
FIG. 4 is a flowchart illustrating a noise reduction process according to a second embodiment.

Additionally, FIG. 3 is a diagram illustrating a frequency distribution of a noise signal Sn. Furthermore, a spectral intensity at a carrier frequency fc is eliminated by, for example, a notch filter or the like and is not used for correction of a spectral intensity, detection of a noise, or the like.

The noise detection unit 113 compares an absolute value of a difference that is calculated by the difference calculation unit 112 with a threshold Th1. Additionally, in a case where a difference before calculating an absolute value is negative, a frequency component in a lower sideband is provided, while in a positive case, a frequency component in an upper sideband is provided. The noise detection unit 113 provides a frequency component with a spectral intensity that is greater than or equal to a threshold Th1 as a frequency component of a noise signal Sn. Furthermore, a spectral intensity L of a detected frequency component, that is, a signal level difference L between upper and lower sidebands for a detected frequency component is provided as a signal level of a noise signal.

Thus, the difference calculation unit 112 calculates a difference between upper and lower sidebands Wm1 and Wm2 of a received signal and the noise detection unit 113 detects a plurality of noise signals Sn based on such a difference, so that it is possible to detect a noise with a higher degree of accuracy.

The calculation unit 120A calculates a coefficient for each frequency component based on a frequency component and a signal level that are detected by the noise detection unit 113. Herein, a coefficient is a filter coefficient of each of the first to n-th filters 131 to 13n of the reduction unit 130A. The calculation unit 120A selects a coefficient, depending on, for example, a coefficient database (DB) 141 that is stored in the storage unit 140, and thereby calculates such a coefficient.

The coefficient DB 141 stores a coefficient for each of a frequency component and a signal level. The calculation unit 120A selects a coefficient with reference to the coefficient DB 141 based on a frequency component and a signal level that are detected by the noise detection unit 113. The calculation unit 120A selects a coefficient with reference to the coefficient DB 141 for each of a plurality of noise signals Sn that are detected by the noise detection unit 113.

Herein, a case will be explained where the number M of noise signals Sn that are detected by the noise detection unit 113 is greater than the number n of noise signals that are capable of being reduced by the noise reduction device 10A (M>n). In such a case, it is possible for the noise reduction device 10A to reduce n noise signals Sn, for example, in descending order of a signal level. That is, the calculation unit 120A selects n coefficients dependent on a frequency component and a signal level of a noise signal Sn in descending order of a signal level.

Thereby, it is possible for the noise reduction device 10A to reduce a noise signal Sn depending on a degree of a signal level.

Alternatively, the noise reduction device 10A may select n noise signals Sn that are reduced in an order of priority dependent on an auditory characteristic. As described above, sound or voice data are included in an AM radio broadcast wave. Accordingly, the noise reduction device 10A reduces a noise signal Sn depending on an auditory characteristic for a sound or voice, so that it is possible to preferentially reduce a noise signal Sn of a frequency component that is readily listened to by a user.

Specifically, for example, the calculation unit 120A selects a coefficient for each of frequency components of n noise signals Sn in order of priority dependent on a high-cut process that is executed by a (non-illustrated) demodulation unit in a latter part of the receiving device LA.

Additionally, although the number M of noise signals S that are detected by the detection unit 110A is greater than the number of the first to n-th filters 131 to 13n herein, this is not limiting. The number M of noise signals Sn may be less than the number n of the first to n-th filters 131 to 13n. In such a case, the calculation unit 120A selects, for example, coefficients of the first to M-th filters 131 to 13M. Furthermore, the noise reduction device 10A prevents remaining (M+1)-th to n-th filters 13(M+1) to 13n from operating. Alternatively, the calculation unit 120A may select coefficients in such a manner that the (M+1)-th to n-th filters 13(M+1) to 13n output signals that are identical to a received signal that is an input signal.

The first to n-th filters 131 to 13n of the reduction unit 130A are, for example, Finite Impulse Response (FIR) notch filters and reduce respective peaky noises from a received signal. The first to n-th filters 131 to 13n are mutually connected in series. The first to n-th filters 131 to 13n respectively filter n noise signals Sn in order, depending on each coefficient that is selected by the calculation unit 120A.

The storage unit 140 stores information needed for a process that is executed by each unit of the noise reduction device 10A, such as a coefficient DB 141 or a threshold Th1. Furthermore, the storage unit 140 stores a result of a process that is executed by each unit of the noise reduction device 10A. The storage unit 140 is, for example, a semiconductor memory element such as a Random Access Memory (RAM) or a flash memory or a storage device such as a hard disk or an optical disc.

Additionally, although the noise reduction device 10A includes the storage unit 140 herein, this is not limiting. For example, the receiving device 1A may include the storage unit 140.

Noise Reduction Process

A noise reduction process that is executed by the noise reduction device 10A will be explained by using FIG. 4. FIG. 4 is a flowchart illustrating a noise reduction process according to the present embodiment. A noise reduction process executes a noise reduction process, for example, in a case where the antenna 20 receives a received signal. A noise reduction process is repeatedly executed with a predetermined period of time while the receiving device 1A receives a received signal.

First, the noise reduction device 10A analyzes a frequency of a received signal (step S101). The noise reduction device 10A calculates a difference between upper and lower sidebands Wm1 and Wm2 of a received signal based on a result of analysis (step S102). The noise reduction device 10A compares an absolute value of a calculated difference with a threshold Th1 (step S103). In a case where an absolute value of a difference is less than a threshold Th1 (step S103; No), the noise reduction device 10A ends a process.

On the other hand, in a case where an absolute value of a difference is greater than or equal to a threshold Th1 (step S103; Yes), the noise reduction device 10A detects a plurality of frequency components and signal levels of a difference with an absolute value that is greater than a threshold Th1 (step S104). The noise reduction device 10A selects a coefficient for each of a plurality of detected frequency components (step S105). The noise reduction device 10A reduces at least n noise signals Sn among a plurality of noise signals Sn from a received signal for each of frequency components of such noise signals Sn depending on a selected coefficient (step S106) and ends a process.

Additionally, although the noise reduction device 10A ends a process at step S103 in a case where an absolute value of a difference is less than a threshold Th1, this is not limiting. In a case where an absolute value of a difference is less than a threshold Th1, the noise reduction device 10A determines that a noise signal Sn is not included in a received signal. Accordingly, the noise reduction device 10A may output a received signal that is produced by the RF unit 30 to a (non-illustrated) latter processing unit directly.

As stated above, the noise reduction device 10A according to the second embodiment reduces a noise signal Sn by using n or the first to n-th filters 131 to 13n, so that it is possible to reduce a plurality of noise signals Sn from a received signal.

Additionally, in the above-mentioned embodiment, a difference L between upper and lower sidebands Wm1 and Wm2 of a received signal is provided as a signal level of a noise signal Sn. Thereby, it is possible for the noise reduction device 10A to reduce a noise signal Sn accurately as compared with, for example, a case where a received signal at a frequency component of a noise signal Sn is reduced by a predetermined level. Furthermore, as compared with, for example, a signal level of a received signal at a frequency component of a noise signal Sn is "0", it is possible to maintain continuity of a frequency spectrum of a received signal and it is possible to improve a receiving accuracy of a received signal. Additionally, depending on a desired reduction accuracy of a noise signal Sn or a reception accuracy of a received signal, a signal level of a received signal that is reduced by the reduction unit 130A may be reduced by a predetermined level or reduced in such a manner that a signal level of a received signal is "0".

Third Embodiment

Figure 5:
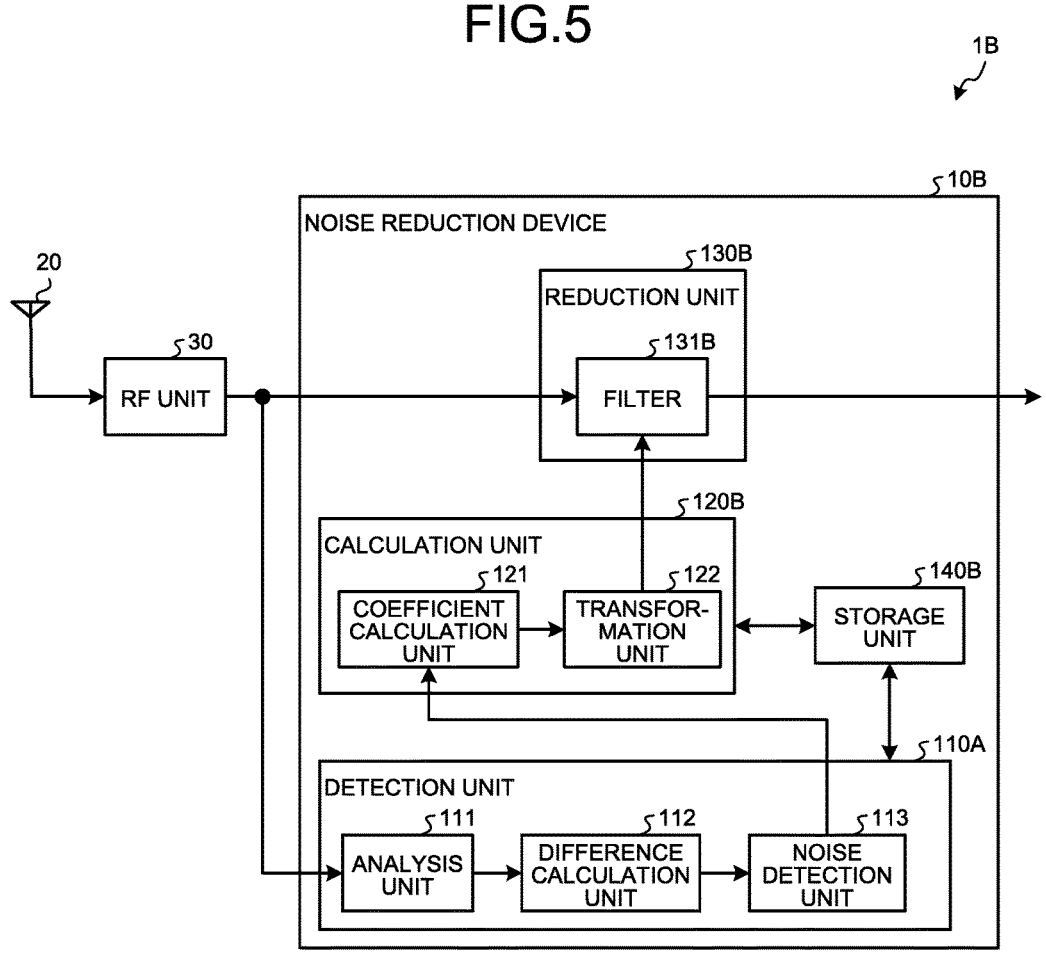
FIG. 5 is a block diagram illustrating a configuration of a receiving device according to a third embodiment.
Figure 6:
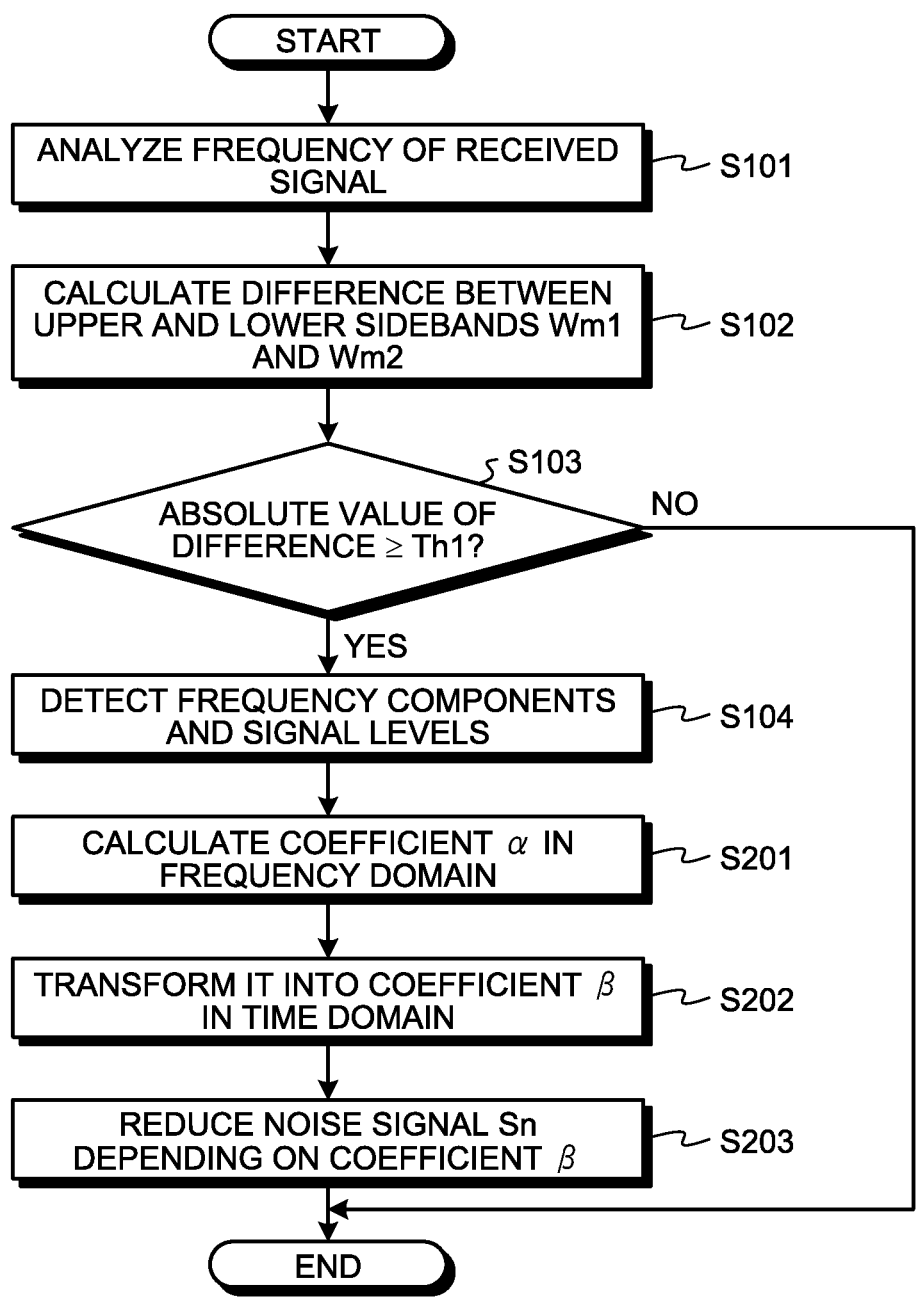
FIG. 6 is a flowchart illustrating a noise reduction process according to a third embodiment.

A receiving device 1B according to a third embodiment will be explained by using FIG. 5 and FIG. 6. FIG. 5 is a block diagram illustrating a configuration of the receiving device 1B according to the third embodiment. Additionally, a component that is identical to that of the receiving device 1A as illustrated in FIG. 2 will be provided with an identical sign and an explanation thereof will be omitted.

Receiving Device 1B

The receiving device 1B as illustrated in FIG. 5 includes a noise reduction device 10B. The noise reduction device 10B has a calculation unit 120B, a reduction unit 130B, and a storage unit 140B. The calculation unit 120B has a coefficient calculation unit 121 and a transformation unit 122. The reduction unit 130B has a filter 131B.

The coefficient calculation unit 121 calculates a coefficient in a frequency domain based on frequency components and signal levels of a plurality of noise signals Sn that are detected by the noise detection unit 113. The coefficient calculation unit 121 calculates a coefficient that reduces signal levels of at least n frequency components of a plurality of noise signals Sn that are detected by the noise detection unit 113, by a signal level that is detected by the noise detection unit 113 (where n is a positive number that is greater than or equal to 2). Additionally, one coefficient that is calculated herein is provided. Furthermore, signal levels of all noise signals Sn that are detected by the noise detection unit 113 are reduced herein.

For example, the coefficient calculation unit 121 calculates a coefficient provided by adding respective coefficients in a frequency domain of first to n-th filters 131 to 13n that are calculated by the calculation unit 120A as illustrated in FIG. 2, as a coefficient α of the reduction unit 130B.

The transformation unit 122 transforms a coefficient in a frequency domain that is calculated by the coefficient calculation unit 121 into a coefficient in a time domain. The transformation unit 122 executes, for example, an Inverse Fast Fourier Transform (IFFT) process.

For example, the transformation unit 122 applies an inverse Fourier transformation to a coefficient α in a frequency domain to calculate a coefficient β in a time domain.

The reduction unit 130B has one filter 131B as described above. The filter 131B is, for example, an FIR notch filter. The filter 131B reduces at least n noise signals Sn among a plurality of noise signals Sn from a received signal, depending on a coefficient β in a time domain that the transformation unit 122 transforms it into.

The storage unit 140B is identical to the storage unit 140 as illustrated in FIG. 2 except that it does not have the coefficient DB 141.

Noise Reduction Process

A noise reduction process that is executed by the noise reduction device 10B will be explained by using FIG. 6. FIG. 6 is a flowchart illustrating a noise reduction process according to the present embodiment. Additionally, a process that is identical to the noise reduction process as illustrated in FIG. 4 will be provided with an identical sign and a redundant explanation will be omitted.

The noise reduction device 10B calculates a coefficient α in a frequency domain that reduces a signal level L of a detected noise signal Sn in a frequency component of the noise signal Sn that is detected at step S104 (step S201). The noise reduction device 10B transforms a coefficient α in a frequency domain into a coefficient β in a time domain (step S202). The noise reduction device 10B reduces n noise signals Sn from a received signal depending on a coefficient β in a time domain (step S203) and ends a process.

As stated above, the noise reduction device 10B according to the present embodiment transforms a coefficient α calculated in a frequency domain into a coefficient β in a time domain, so that it is possible to reduce n noise signals Sn, for example, by the one filter 131B. Thereby, it is possible to reduce a throughput and a circuit size of the reduction unit 130B as compared with the noise reduction device 10A according to the second embodiment.

Furthermore, whereas the noise reduction device 10A selects a coefficient, for example, with reference to the coefficient DB 141, the noise reduction device 10B according to the present embodiment adds a coefficient for each of frequency components of a noise signal Sn to calculate a coefficient α. Thereby, it is possible to reliably reduce, for example, even a noise signal Sn with a frequency component that is not stored in the coefficient DB 141, from a received signal.

Furthermore, the number of noise signals Sn that are capable of being reduced in the noise reduction device 10A is equal to the number of the first to n-th filters 131 to 13n that are possessed by the reduction unit 130A. On the other hand, it is possible for the noise reduction device 10B according to the present embodiment to calculate a coefficient α independently of the number of noise signals Sn. Accordingly, even if only one filter 131B is provided, it is possible to reduce all of a plurality of noise signals Sn that are detected by the detection unit 110A.

Additionally, although the noise reduction device 10B according to the present embodiment is provided with the one filter 131B of the reduction unit 130B, this is not limiting. It is sufficient to transform coefficients that reduce a plurality of noise signals Sn into coefficients in a time domain collectively, and for example, two or more filters of the reduction unit 130B may be provided.

Variation

Figure 7:
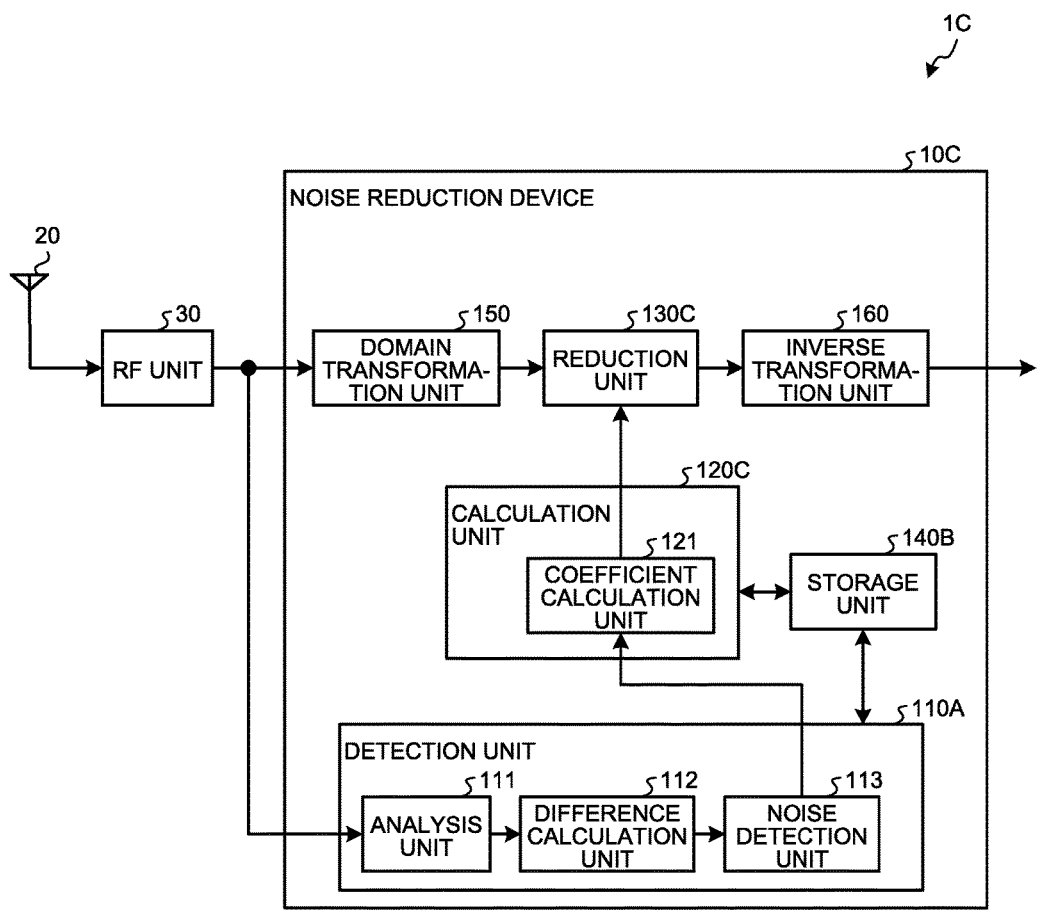
FIG. 7 is a block diagram illustrating a configuration of a receiving device according to a variation.
Figure 8:
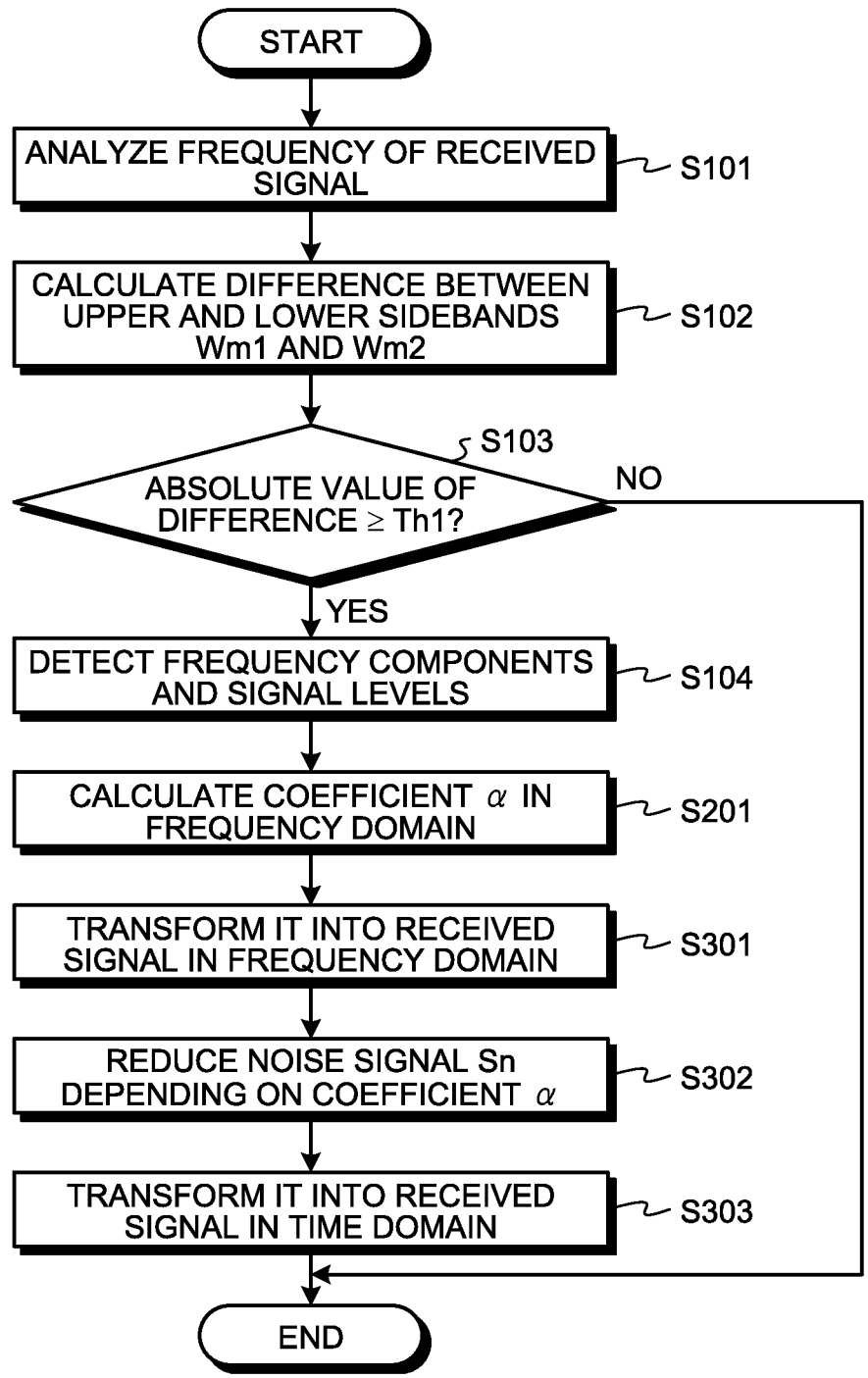
FIG. 8 is a flowchart illustrating a noise reduction process according to a variation.

Next, a variation of the third embodiment will be explained by using FIG. 7 and FIG. 8. FIG. 7 is a block diagram illustrating a configuration of a receiving device 1C according to the present variation. The receiving device 1C according to the present variation is different from the receiving device 1B that reduces a noise signal Sn in a time domain in that a noise signal Sn is reduced in a frequency domain.

The receiving device 1C has a noise reduction device 10C. The noise reduction device 10C has a calculation unit 120C, a reduction unit 130C, a domain transformation unit 150, and an inverse transformation unit 160.

The calculation unit 120C is identical to the calculation unit 120B in that it does not have the transformation unit 122. The calculation unit 120C calculates a coefficient α in a frequency domain.

The domain transformation unit 150 transforms a received signal from a signal in a time domain into a signal in a frequency domain. The domain transformation unit 150 executes an FFT process for a received signal so that a received signal in a frequency domain is generated.

The reduction unit 130C has an attenuator that reduces n noise signals Sn from a received signal in a frequency domain depending on a coefficient α in a frequency domain. The reduction unit 130C reduces n noise signals Sn depending on a coefficient α from a received signal in a frequency domain.

The inverse transformation unit 160 transforms a received signal in a frequency domain with n reduced noise signals Sn into a received signal in a time domain. The inverse transformation unit 160 applies an IFFT process to a received signal with n reduced noise signals Sn so that a received signal in a time domain with n reduced noise signals Sn is generated.

Noise Reduction Process

A noise reduction process that is executed by the noise reduction device 10C will be explained by using FIG. 8. FIG. 8 is a flowchart illustrating a noise reduction process according to the present variation. Additionally, a process that is identical to the noise reduction process as illustrated in FIG. 6 will be provided with an identical sign and a redundant explanation will be omitted.

The noise reduction device 10C calculates a coefficient α in a frequency domain at step S201, and then, transforms a received signal into a signal in a frequency domain (step S301). The noise reduction device 10C reduces a noise signal Sn from a received signal in a frequency domain depending on a coefficient α (step S302). The noise reduction device 10C transforms a received signal with a reduced noise signal Sn into a received signal in a time domain (step S303) and ends a process.

Additionally, although a coefficient α is calculated at step S201, and subsequently, a received signal is transformed into a signal in a frequency domain at step S301 herein, this is not limiting. It is sufficient to transform it into a received signal in a frequency domain before a noise signal Sn is reduced from a received signal at step S302, and it may be executed in step S101 to step S104. Alternatively, a process may be executed in parallel to these processes.

As stated above, it is possible for the noise reduction device 10C according to the present variation to obtain an effect that is similar to that of the noise reduction device 10B according to the third embodiment and reduce a plurality of noise signals Sn from a received signal even in a frequency domain.

Additionally, although a process that returns a received signal with a reduced noise signal Sn to that in a time domain is executed in the above-mentioned variation, it is also possible to omit such a process. For example, in a case where a signal process is applied to a received signal in a frequency domain in a latter process, the noise reduction device 10C may output a received signal in a frequency domain to a (non-illustrated) latter processing unit. In such a case, it is possible to omit the inverse transformation unit 160.

Furthermore, although each of the analysis unit 111 and the domain transformation unit 150 executes an FFT process in the above-mentioned variation, this is not limiting. It is also possible to integrate processes of the analysis unit 111 and the domain transformation unit 150, where, for example, the difference calculation unit 112 calculates a difference between upper and lower sidebands Wm1 and Wm2 of a received signal by using a received signal in a frequency domain that the domain transformation unit 150 transforms it into, or the like.

As stated above, the noise reduction device 10 or 10A to 10C according to each of the embodiments and the variation includes the detection unit 110 or 110A, the calculation unit 120, 120A to 120C, and the reduction unit 130 or 130A to 130C. The detection unit 110 or 110A detects frequency components of a plurality of noise signals Sn that are included in a received signal, based on a frequency spectrum of the received signal. The calculation unit 120 or 120A to 120C calculates a coefficient, based on frequency components that are detected by the detection unit 110 or 110A. The reduction unit 130 or 130A to 130C reduces n noise signal(s) Sn among a plurality of noise signals Sn from a received signal, depending on a coefficient that is calculated by the calculation unit 120 or 120A to 120C (where n is a positive number greater than or equal to 1).

Thereby, it is possible for the noise reduction device 10 or 10A to 10C according to each of the embodiments and the variation to reduce a plurality of noise signals Sn from a received signal.

Furthermore, the reduction unit 130A of the noise reduction device 10A according to the second embodiment includes the n or first to n-th filters 131 to 13n that filter n noise signals Sn, respectively. Furthermore, the calculation unit 120A calculates a coefficient for each of the n or first to n-th filters 131 to 13n for each of n frequency components that are detected by the detection unit 110A.

Thus, the noise reduction device 10A reduces a noise signal Sn by using the n or first to n-th filters 131 to 13n, so that it is possible to reduce a plurality of noise signals Sn from a received signal.

Furthermore, the detection unit 110A of the noise reduction device 10B according to the third embodiment detects signal levels of n noise signals Sn. Furthermore, the calculation unit 120B includes the coefficient calculation unit 121 and the transformation unit 122. The coefficient calculation unit 121 calculates a coefficient α in a frequency domain, based on frequency components and signal levels that are detected by the detection unit 110A. The transformation unit 122 transforms a coefficient α in a frequency domain that is calculated by the coefficient calculation unit 121 into a coefficient β in a time domain. Furthermore, the reduction unit 130B reduces n noise signals Sn from a received signal in a time domain depending on a coefficient β in a time domain that the transformation unit 122 transforms it into.

Thus, the noise reduction device 10B transforms a coefficient α that is calculated in a frequency domain into a coefficient β in a time domain, so that it is possible to reduce n noise signals Sn by, for example, the one filter 131B. Thereby, it is possible to reduce a throughput and a circuit size of the noise reduction device 10B according to the third embodiment.

Furthermore, the detection unit 110A of the noise detection device 10C according to the variation detects signal levels of n noise signals Sn. Furthermore, the calculation unit 120C calculates a coefficient α in a frequency domain based on frequency components and signal levels that are detected by the detection unit 110A. The reduction unit 130C reduces n noise signals Sn from a received signal in a frequency domain depending on a coefficient β in a frequency domain that is calculated by the calculation unit 120C.

Thus, it is possible for the noise reduction device 10C according to the variation to obtain an effect that is similar to that of the noise reduction device 10B according to the third embodiment and reduce a plurality of noise signals Sn from a received signal even in a frequency domain.

Furthermore, the detection unit 110A of the noise reduction device 10A to 10C according to each of the embodiments and the variation includes the difference calculation unit 112 and the noise detection unit 113. The difference calculation unit 112 calculates a difference between upper and lower sidebands Wm1 and Wm2 of a frequency spectrum of a received signal. The noise detection unit 113 detects a frequency component and a signal level based on a difference that is calculated by the difference calculation unit 112.

Thus, the difference calculation unit 112 calculates a difference between upper and lower sidebands Wm1 and Wm2 of a received signal and the noise detection unit 113 detects a plurality of noise signals Sn based on such a difference, so that it is possible to detect a noise more accurately.

Furthermore, the noise detection unit 113 of the noise reduction device 10A to 10C according to each of the embodiments and the variation provides a signal level difference L between upper and lower sidebands Wm1 and Wm2 at a frequency component of a noise signal Sn as a signal level that is reduced by the reduction unit 130A to 130C.

Thereby, it is possible for the noise reduction device 10A to 10C to reduce a noise signal Sn accurately as compared with, for example, a case where a received signal at a frequency component of a noise signal Sn is reduced by a predetermined level.

According to an embodiment, it is possible to provide a noise reduction device and a noise reduction method that are capable of reducing a plurality of noise signals that are included in a received signal.

It is possible for a person skilled in the art to readily derive an additional effect or variation. Accordingly, a broader aspect of the present invention is not limited to a specific detail and a representative embodiment as illustrated and described above. Therefore, various modifications are possible without deviating from the spirit or scope of a general inventive concept that is defined by the appended claim(s) and an equivalent(s) thereof.

The invention claimed is:

1. A noise reduction device, comprising:
a detection unit that detects frequency components of a plurality of noise signals that are included in a received signal, based on a frequency spectrum of the received signal;
a calculation unit that calculates a coefficient, based on the frequency components that are detected by the detection unit; and
a reduction unit that reduces n noise signals that are at least a part of the plurality of noise signals from the received signal, depending on the coefficient that is calculated by the calculation unit, where n is a positive number that is greater than or equal to 2,
wherein
the detection unit detects signal levels of the n noise signals;
the calculation unit includes
a coefficient calculation unit that calculates the coefficient in a frequency domain, based on the frequency components and the signal levels that are detected by the detection unit, and
a transformation unit that transforms the coefficient in a frequency domain that is calculated by the coefficient calculation unit into the coefficient in a time domain; and
the reduction unit reduces the n noise signals from the received signal, in a time domain, depending on the coefficient in a time domain that the transformation unit transforms the coefficient in a frequency domain into.

2. The noise reduction device according to claim 1, wherein
the detection unit includes:
a difference calculation unit that calculates a difference between upper and lower sidebands of a frequency spectrum of the received signal; and
a noise detection unit that detects the frequency components and the signal levels, based on the difference that is calculated by the difference calculation unit.

3. The noise reduction device according to claim 2, wherein:
the noise detection unit provides a signal level difference between the upper and lower sidebands in the frequency components of the noise signals as the signal levels that are reduced by the reduction unit.

4. A noise reduction method, comprising:
detecting frequency components of a plurality of noise signals that are included in a received signal, based on a frequency spectrum of the received signal;
calculating a coefficient, based on the detected frequency components; and
reducing n noise signals that are at least a part of the plurality of noise signals from the received signal, depending on the calculated coefficient, where n is a positive number that is greater than or equal to 2,
wherein
the detecting includes detecting signal levels of the n noise signals;
the calculating includes
calculating the coefficient in a frequency domain, based on the detected frequency components and the detected signal levels, and
transforming the calculated coefficient in a frequency domain into the coefficient in a time domain; and
the reducing reduces the n noise signals from the received signal, in a time domain, depending on the coefficient in a time domain that the coefficient in a frequency domain is transformed into.

* * * * *